Nov. 7, 1950 T. F. SAFFADY 2,528,610

SOUND RECORD DISK

Filed March 2, 1946 2 Sheets-Sheet 1

Inventor
Thomas F. Saffady
by William A. Sewald
Att'y

Nov. 7, 1950 T. F. SAFFADY 2,528,610

SOUND RECORD DISK

Filed March 2, 1946 2 Sheets-Sheet 2

Inventor
Thomas F. Saffady
by William A. Sevald
Att'y

Patented Nov. 7, 1950 2,528,610

UNITED STATES PATENT OFFICE 2,528,610

SOUND RECORD DISK

Thomas F. Saffady, Detroit, Mich., assignor, by direct and mesne assignments, of one-half to Vogue Recordings, Incorporated, Warren Township, Mich., a corporation of Michigan, and one-half to William T. Sevald, Royal Oak, Mich.

Application March 2, 1946, Serial No. 651,458

10 Claims. (Cl. 274—42)

The object of my invention is to provide a sound record of simple, durable and inexpensive construction and this application constitutes a continuation-in-part of my application, Serial No. 612,436, filed August 24, 1945, now abandoned.

Still a further object of my invention is to provide a sound record which will be ornamental in appearance, non-breakable with any ordinary usage, and relatively inexpensive to make.

Still a further object of my invention is to provide a record having a metal backing disc, sheets of material on either side thereof bearing ornamental designs such as pictures and the identification of the music reproduced, and to form a plastic covering for these discs, which is transparent so that the ornamental discs may be seen and which may receive the sound track for the record.

Still a further object is to provide a metal backing disc and to coat this backing disc with a thin coat of thermoplastic, to cover the backing disc with ornamental discs and then to cover the whole with a transparent thermoplastic which is molded onto the discs in the presence of heat, the same heat serving to plasticize the original coating on the backing disc so that the discs and coating are firmly united together.

With these and other objects in view, my invention consists in the arrangement, construction and combination of the various parts of my improved device as described in the specification claimed in the claims and shown in the accompanying drawings, in which:

Figure 1:
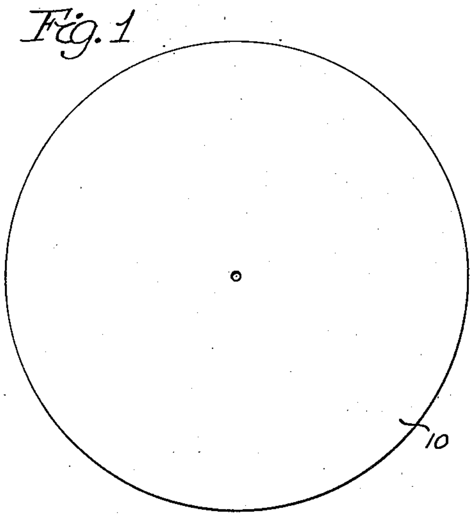
Figure 1 shows a plan view of the backing disc for my improved record.
Figure 2:
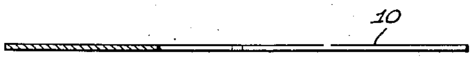
Figure 2 shows a horizontal elevation of the same disc, parts being shown in section to better illustrate the construction.

Referring to the drawings, I have shown the backing disc 10 in Figures 1 and 2. This is preferably a sheet of aluminum alloy which has a very definite amount of resiliency so that it will return to its normal shape if it is somewhat bent.

Figure 3:
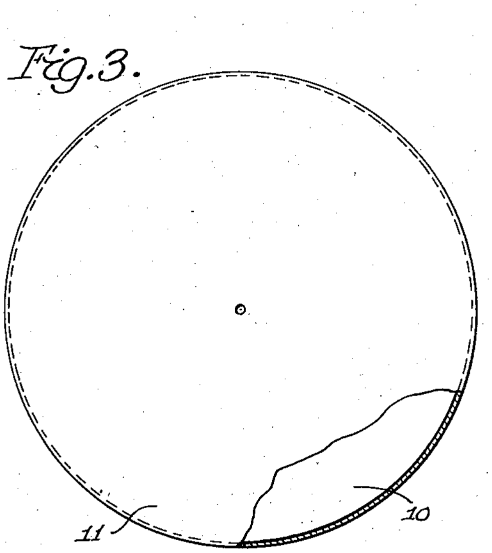
Figure 3 shows a plan view of the disc after it has been coated with the thermoplastic material, parts being broken away to better illustrate the construction.
Figure 4:
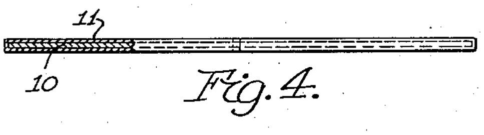
Figure 4 shows a side elevation partly in section of the disc shown in Figure 3.
Figure 5:
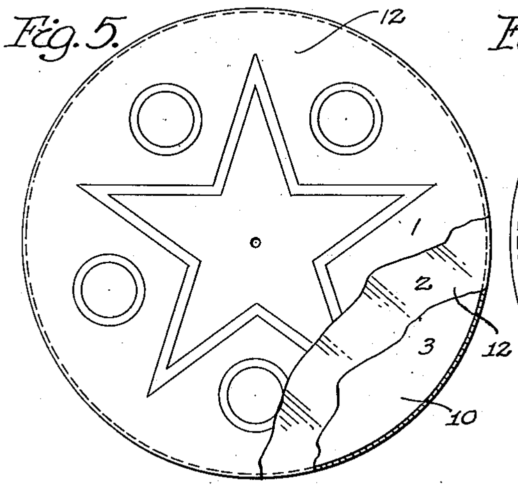
Figure 5 shows a plan view of the ornamental disc, parts being broken away to show some of the thermoplastic coating and the backing disc.
Figure 6:
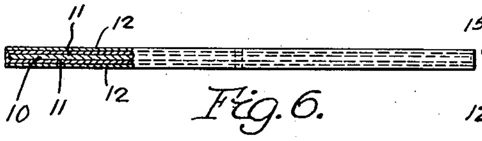
Figure 6 shows a side elevation of the disc shown in Figure 5, parts being shown in section to better illustrate the construction.

This disc is dipped in a solution formed by mixing copolymer of vinyl acetate and vinyl chloride modified with maleic anhydride with a solvent such as methyl ethyl ketone. These are mixed into proportions of 100 grams of the vinyl to a liter of the solvent. This forms a fairly free-flowing liquid and is satisfactory for the purpose here intended, but it will be understood that other thermoplastics may be substituted for the vinyl here used and the solvent may likewise be varied, and somewhat similar results secured. The backing disc after being dipped in this vinyl solution is dried until the solvent is either entirely or almost entirely evaporated. This leaves a thin coating 11 of dry vinyl on the backing disc somewhere between one-half thousandth and one thousandth of an inch thick. The coated backing disc is illustrated in Figures 3 and 4 of the drawings. After the backing disc has been properly coated and dried, then a disc 12 of material capable of receiving ornamental designs on the surface thereof, such as paper, is superposed on each side of the backing disc as shown in Figures 5 and 6. In Figure 5 the paper, the coating and the backing disc are each shown by breaking away parts of the record. These layers are also shown in section in part of Figure 6.

Figure 7:
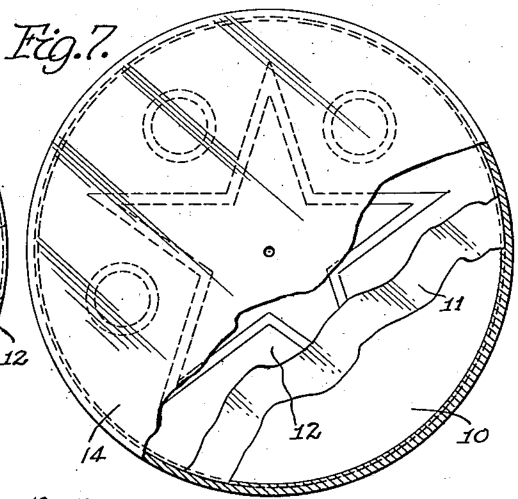
Figure 7 shows a plan view of the completed sound disc, parts being broken away from the thermoplastic coating so that part of the ornamental disc, part of the coating on the backing disc, and part of the backing disc are shown.
Figure 8:
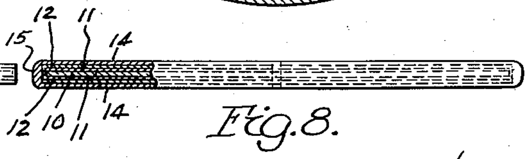
Figure 8 shows a side elevation of the disc shown in Figure 7, parts being shown in section to better illustrate the construction.
Figure 9:
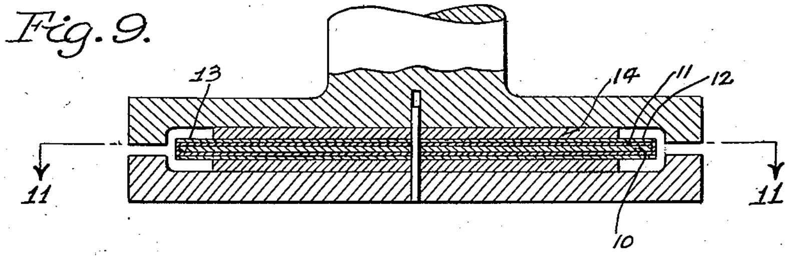
Figure 9 shows a diagrammatic view of the mold in vertical section prior to the final forming of the parts of my sound record.
Figure 10:
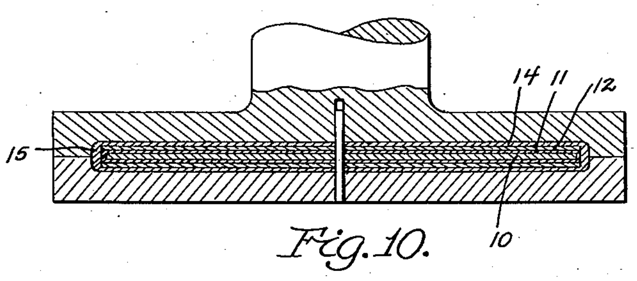
Figure 10 shows a similar view after the mold has been closed to finally form the record.
Figure 11:
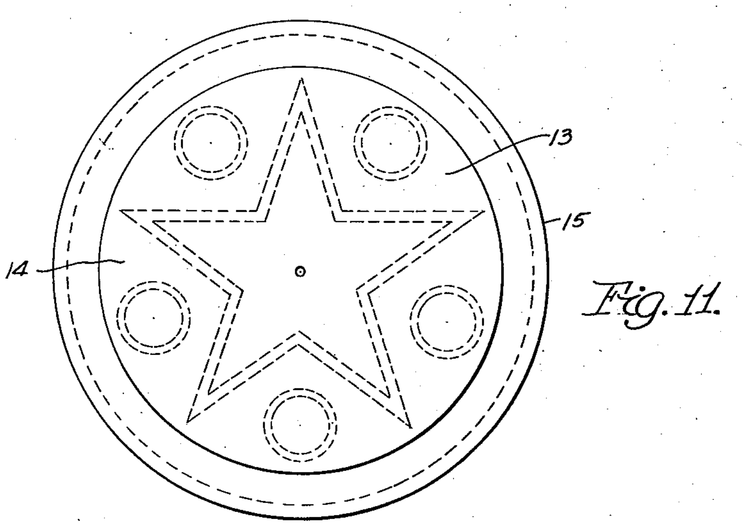
Figure 11 is a horizontal, sectional view on the line 11—11 of Figure 9.
Figure 12:
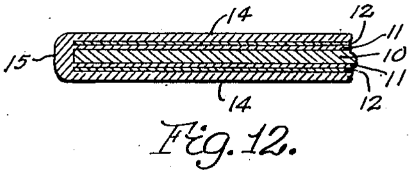
Figure 12 is a vertical enlarged sectional view through the portion of the finished record near one edge thereof to more clearly indicate the construction.

After these ornamental discs are applied, then preforms 13 are superposed on the paper ornamental discs. The assembly thus formed is illustrated in section in Figure 9. Prior to the placing of the assembly in the mold as shown in Figure 9, all the parts of the record are preheated to a stage just below the flow point of the thermoplastic. After being placed in the mold as shown in Figure 9, the parts of the mold are brought together to form the finished record as shown in Figure 10 in section. It will be understood that these molds are considerably more complicated than as here shown as they are provided with means for quickly heating them and for quickly cooling them during the cycle of forming the record. Similar molds are used with other types of records in the forming thereof so that construction of such molds together with the provision for heating and cooling them is not, therefore, here shown. In Figures 7 and 8 I have shown the completed record with the outside coating 14 of transparent thermoplastic, which receives the sound track at the same time that the record is molded, this outside coating being broken away in Figure 7 to show the design disc, the backing disc coating and the backing disc. These same layers are shown in a partial section in Figure 8. In Figure 11 I have shown a plan view of the parts assembled, ready to be put into the mold, as shown in Figure 9. In Figure 12 I have shown an enlarged vertical sectional view through the completed record to better illustrate the construction. It will be noted that the outside thermoplastic coating and the discs are so proportioned that a wall 15 of the outside coating forms the edge of the record, thereby giving it a very pleasing appearance. It will be understood that the design disc is intended to have identifying indicia around the edge thereof to indicate the name of the production recorded, the name of the author, composer, and orchestra making the production, and name of the manufacturer of the record. The central portion of the design disc is intended to receive pictures indicative of the music of the production with perhaps pictures of the singer or orchestra leader.

Some changes may be made in the arrangement, construction and combination of the various parts of my improved device without departing from the spirit of my invention and it is my intention to cover by my claims such changes as may reasonably be included within the scope of my invention.

I claim as my invention:

1. On a sound record, a backing disc, a design disc and a thermoplastic transparent coating material around and between said discs, the outer surface of the material having a sound track therein; the material enveloping said backing disc being substantially identical and compatible with the outer thermoplastic material having the sound track therein.

2. A sound record comprising a backing disc, a thermoplastic adhesive layer enveloping said disc, slightly larger design discs on either side of said backing disc, layers of transparent material larger than said design discs on said design discs, a thicker portion in said transparent layers outside the area of said backing disc and said design discs uniting said layers at their peripheries, and sound tracks in the exposed surfaces of said layers.

3. In a sound record, a backing disc, a thermoplastic material surrounding said disc, a design disc, substantially identical thermoplastic material characterized by transparency covering said design disc and integrally united with said first thermoplastic material to envelope said design disc in thermoplastic material, and sound tracks embedded in said substantially identical thermoplastic material.

4. In a sound record, a backing disc, a design disc, thermoplastic material between and securing the two discs together and substantially identical thermoplastic material characterized by transparency over said design disc integrally united with said first thermoplastic material to envelop said design disc; the outer surface of said substantially identical thermoplastic material having a sound track therein.

5. In a sound record, a backing disc, design discs on either side of said backing disc, thermoplastic material between said backing disc and said design discs, and substantially identical thermoplastic material characterized by transparency over said design discs uniting with said thermoplastic material between said discs to envelop said design discs on either side of said backing disc; the outer surface of said substantially identical thermoplastic material having a sound track therein.

6. A sound record comprising a backing disc, a thermoplastic layer enclosing said backing disc, design discs on either side of said backing disc over said layer, substantially identical thermoplastic layers characterized by transparency over said design discs uniting with said thermoplastic layer to envelop said design disc; and sound tracks embedded in said substantially identical thermoplastic layers on either side of said record.

7. A sound record comprising a supporting disc, a thermoplastic layer surrounding said supporting disc, a design disc on said layer on either side of said backing disc, substantially identical thermoplastic layers characterized by transparency over said design discs uniting with each other and with said thermoplastic layer to envelop said design discs on either side of said backing disc, and sound tracks embedded in said substantially identical thermoplastic layers on either side of said record.

8. A disc phonograph record comprising an aluminum core member, a coating of bonding agent enveloping said core, a pictorial illustration bonded to said core by said agent, a layer of transparent plastic material bonded over said illustration uniting with said agent to envelop said illustration, an outer rim composed of said plastic material surrounding the peripheral edges of said core and illustration, and a sound track impressed into said plastic material.

9. An article as set forth in claim 3 wherein said first thermoplastic material and said second transparent thermoplastic material are bonded together at the outer edge of said illustration and backing disc.

10. An article as set forth in claim 3 wherein said design discs are slightly larger in diameter than said backing disc.

THOMAS F. SAFFADY.

REFERENCES CITED

The following references are of record in the file of this patent:

UNITED STATES PATENTS

| Number | Name | Date |
|---|---|---|
| 1,050,932 | Emerson | Jan. 21, 1913 |
| 1,926,130 | Whyte | Sept. 12, 1933 |
| 1,946,596 | Symonds | Feb. 13, 1934 |
| 1,999,413 | Hemming et al. | Apr. 30, 1935 |
| 2,184,524 | Hoffman | Dec. 26, 1939 |
| 2,250,140 | Shuemaker | July 22, 1941 |
| 2,329,456 | Campbell | Sept. 14, 1943 |
| 2,352,285 | Proctor | June 27, 1944 |
| 2,353,369 | Sears | July 11, 1944 |

FOREIGN PATENTS

| Number | Country | Date |
|---|---|---|
| 317,415 | Great Britain | Aug. 12, 1929 |
| 326,766 | Great Britain | Mar. 14, 1930 |
| 391,457 | Great Britain | Apr. 28, 1933 |